J. I. RANDOLPH.
HOLDER FOR ANTISKID CHAINS.
APPLICATION FILED MAR. 3, 1919.

1,320,916.

Patented Nov. 4, 1919

INVENTOR
James J. Randolph

UNITED STATES PATENT OFFICE.

JAMES I. RANDOLPH, OF RIMERSBURG, PENNSYLVANIA.

HOLDER FOR ANTISKID CHAINS.

1,320,916.  Specification of Letters Patent.  Patented Nov. 4, 1919.

Application filed March 3, 1919. Serial No. 280,246.

*To all whom it may concern:*

Be it known that I, JAMES I. RANDOLPH, a citizen of the United States, a resident of Rimersburg, in the county of Clarion and State of Pennsylvania, have invented a new and useful Improvement in Holders for Anti-skid Chains; and I do hereby declare the following to be a full, clear, and exact description thereof.

My invention relates to a holding device for anti-skid chains.

The object of my invention is to provide a simple and efficient form of holding device which will act to securely hold the chains in place, and will at the same time allow for the creeping of the chain without in any way disturbing or affecting the efficiency of the holding device.

To these ends my invention comprises the novel features hereinafter set forth and claimed.

Figure 1:
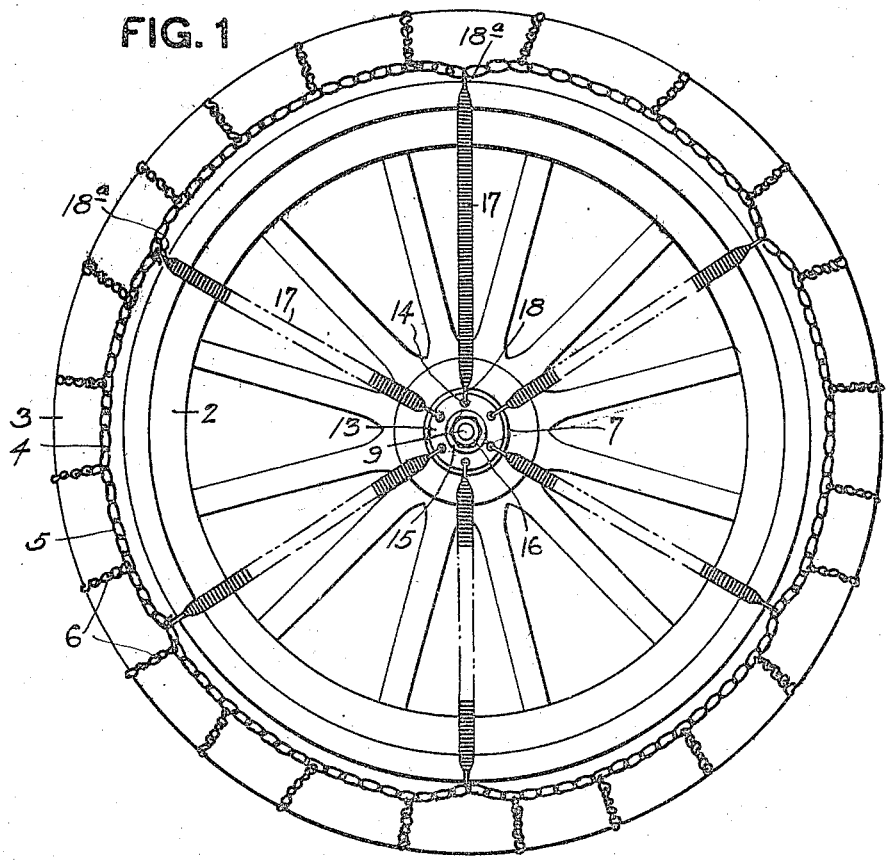
Figure 2:
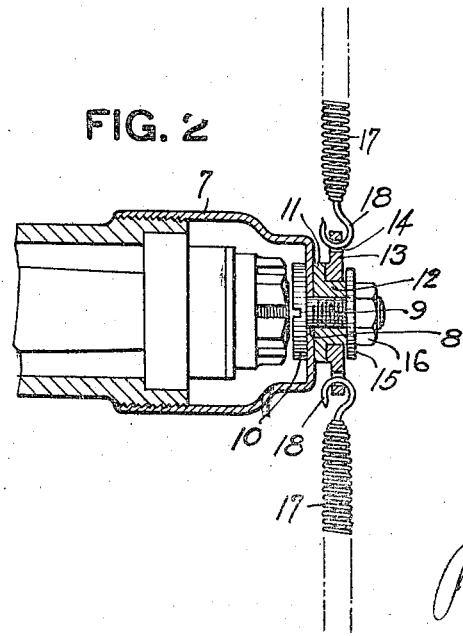

In the accompanying drawing, Figure 1 is a face view of a wheel showing my invention applied thereto; and Fig. 2 is an enlarged sectional view of the hub.

In the drawing, the numeral 2 designates an automobile wheel provided with the pneumatic tire 3, with the anti-skid chain 4 applied thereto, said chain being of the ordinary construction comprising the circular or ring portions 5 connected by the transverse sections 6.

The wheel illustrated is an ordinary wheel of a type provided with the hub-cap 7. An opening 8 is formed in the hub-cap and extending through said opening is the screw 9 with the head 10 on the inside of said cap. A jam-collar 11 engages the screw and said jam-collar bears up against the outer end of the cap locking said screw in position. The collar 11 has the neck portion 12 and surrounding said neck is the disk or connecting plate 13 provided with openings 14 formed at intervals at its outer edge. This disk is held in place on the screw 9 by the washer 15, and nut 16. By this construction the disk or connecting plate 13 is swiveled on the screw and consequently capable of a certain amount of rotary play.

Connected to the disk 13 are the springs 17, said springs having the hooked ends 18 which engage the openings 14 in the disk 13. The other ends of the springs are provided with hooks 18ª which engage the side chains 5 at intervals, as clearly shown in Fig. 1.

It is apparent that it is not necessary to employ springs as the connecting medium between the plate 13 and the chains, as any suitable connecting device may be employed. By this construction, the chains are held securely in position directly to the hub of the wheel and due to the fact that the disk 13 is allowed a certain amount of rotary play, the chains are permitted to creep on the wheel without in any way disturbing the lock.

By having the connecting disk connected up with the hub, it is always in position for use, and the connection can be made quickly by simply hooking the springs into the openings in the disk and then connecting them up to the side chains. Furthermore, the connection is so secure that liability of losing the chain is practically avoided.

What I claim is:

1. In a holding device for anti-skid chains, the combination with a wheel, of an anti-skid chain applied thereto, a hub, a projection extending out from said hub, a plate fitting snugly around said projection as a bearing and rotatable thereon, said plate having openings formed therein and connecting devices connected to said chain and engaging said openings in said plate.

2. In a holding device for anti-skid chains, the combination with a wheel, of an anti-skid chain applied thereto, a hub-cap having an opening therein, a screw projecting through said opening, a jam-collar on said screw, a neck portion on said jam-collar, a connecting plate mounted to turn on said neck, means for securing said connecting plate in position, and connecting devices between said plate and said chain.

In testimony whereof, I, the said JAMES I. RANDOLPH, have hereunto set my hand.

JAMES I. RANDOLPH.

Witnesses:
 A. E. CLANEY,
 ROBT. D. TOTTEN.